H. R. MEYER.
MOUNTING OF CONTROL APPARATUS.
APPLICATION FILED MAY 6, 1919.
1,416,046.
Patented May 16, 1922.
2 SHEETS—SHEET 2.
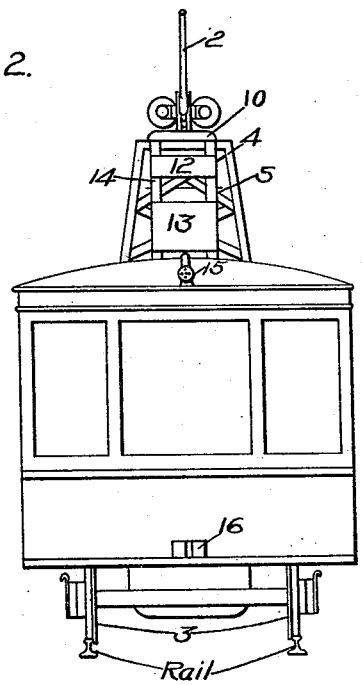
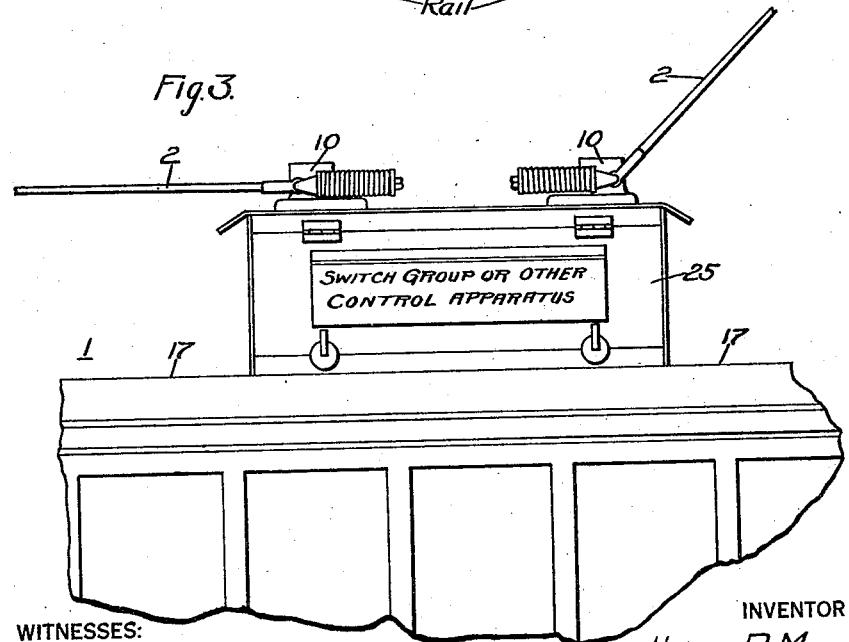
WITNESSES:
J. B. Merrill
W. R. Coley
INVENTOR
Harry R. Meyer
BY
Wesley G. Carr
ATTORNEY

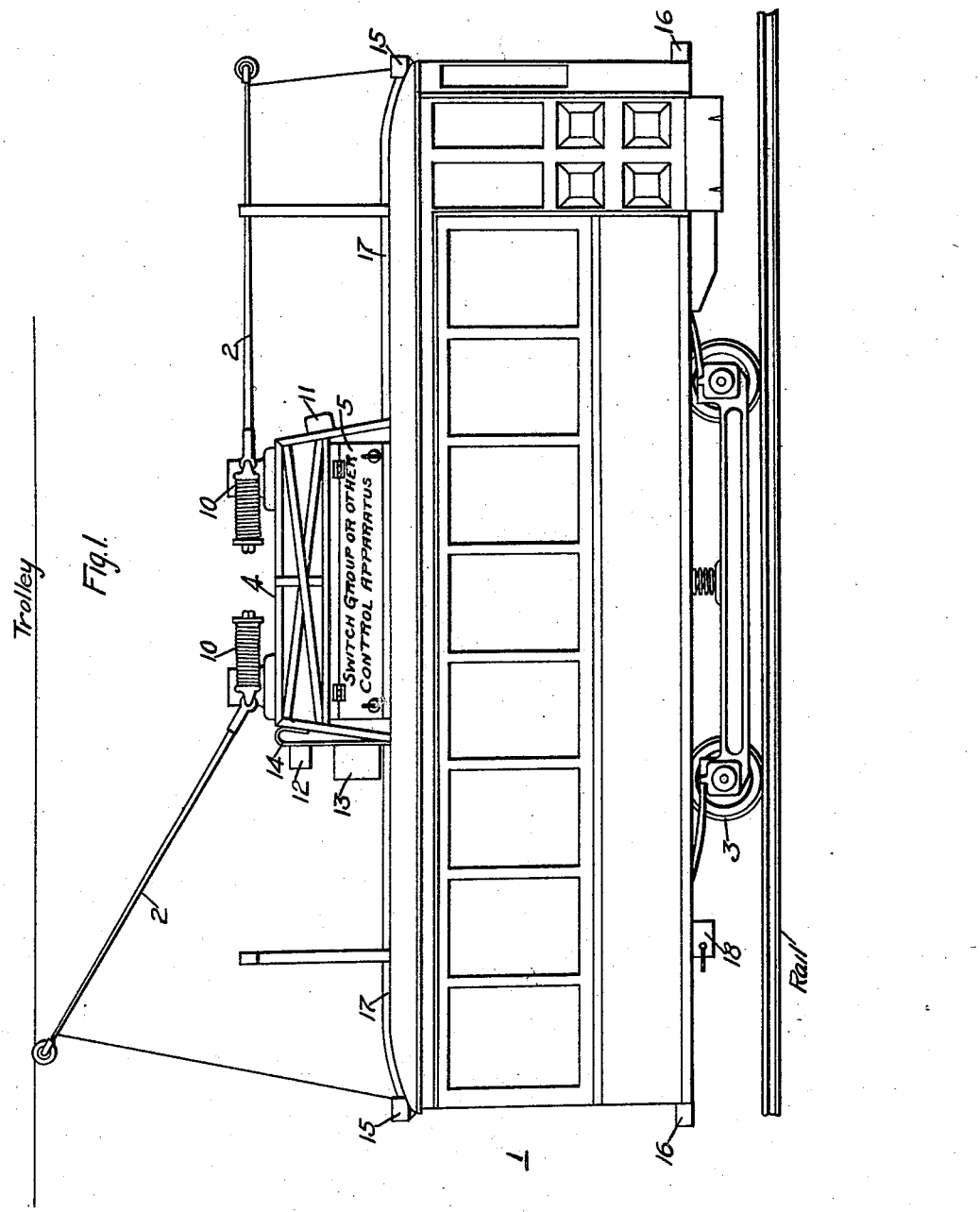

UNITED STATES PATENT OFFICE.

HARRY R. MEYER, OF WILKINSBURG, PENNSYLVANIA, ASSIGNOR TO WESTINGHOUSE ELECTRIC & MANUFACTURING COMPANY, A CORPORATION OF PENNSYLVANIA.

MOUNTING OF CONTROL APPARATUS.

1,416,046.   Specification of Letters Patent.   Patented May 16, 1922.

Application filed May 6, 1919. Serial No. 295,177.

*To all whom it may concern:*

Be it known that I, HARRY R. MEYER, a citizen of the United States, and a resident of Wilkinsburg, in the county of Allegheny and State of Pennsylvania, have invented a new and useful Improvement in Mountings of Control Apparatus, of which the following is a specification.

My invention relates to the mounting of control apparatus, particularly in the case of so-called "one-man" or "safety" cars.

One object of my invention is to employ hitherto unused space upon a vehicle for housing certain control apparatus, whereby a corresponding amount of space is saved within the vehicle and, at the same time, inspection and repair of apparatus is rendered easier.

More specifically stated, it is an object of my invention to utilize the box-like superstructure that is normally placed upon roofs of "one-man" cars for not only acting as a support or mounting-place for the trolley-poles, but also as an enclosure for certain control apparatus, such as the switch group.

Other objects of my invention will become evident from the following detailed description taken in conjunction with the accompanying drawings, wherein Fig. 1 is a side elevational view of a "one-man" or "safety" car employing my present invention; Fig. 2 is an end view thereof; and Fig. 3 is a view, in side elevation, of a modification of the invention.

In the present form of "one-man" cars, the height of the car body has been materially reduced from that of prior electric-railway vehicles, in order to save material and weight. However, the trolley wires remain at the same distance from the ground as heretofore, which necessitates the use of the familiar latticed superstructure upon the roof for supporting the standard-length trolley-poles, which, if mounted directly upon the car roof, would operate at an undesirably large angle with the trolley wire and would, moreover, when pulled down, project an undue length beyond the ends of the car.

Furthermore, the floors of "one-man" cars have been made as low as possible to reduce the size of the vehicle wheels and, in general, to decrease the car weight, as well as affording the opportunity for quick loading and discharge of passengers. However, the use of such low floors has necessitated the employment of an unduly large amount of platform space or other space within the vehicle to accommodate all the control apparatus that is necessary, particularly in the case of multiple-unit or train operation.

According to my present invention, I remove certain of the control apparatus from within the car body, whereby the maximum amount of seating or operating space is rendered available, and place such apparatus within the hitherto unemployed space formed by the superstructure or bridge upon which the trolley bases are mounted.

Referring to the illustrated apparatus in detail, Fig. 1 and Fig. 2 show a "one-man" or "safety" car of a familiar light-weight construction. The usual supply-circuit conductors marked "Trolley" and "Rail" are employed for conveying energy to the vehicle motors through the agency of a suitable current-collector, such as a trolley-pole 2, and the vehicle wheels 3.

The previously mentioned latticed superstructure or bridge, designated as 4, is mounted upon the vehicle roof to serve the joint purpose of housing certain control apparatus, such as a switch group 5, and providing a mounting-place for the trolley-bases 10. By employing the type of side-bracing illustrated, easy access to the entire switch group, for the purpose of inspection or repair, is afforded.

In addition to placing the switch group 5, or the like, in the hitherto empty space between the trolley-bases and the car roof, the customarily employed lightning arrester 11 may be mounted upon the one end of the superstructure 4, while a main fuse-box 12 and a main-circuit hand-switch 13 may be either mounted directly upon the other end of the bridge 4 or upon a set of straps 14 which, in turn, are secured to the bridge.

For the purpose of permitting multiple-unit control of cars, suitable train-line receptacles 15 may be placed near the respective ends of the roof, where they may be readily reached by the motorman when standing upon the car bumper or coupler 16. The necessary train-line conductors may be led from each receptacle 15 to the switch group 5 or other apparatus through suitable conduits 17, which are laid directly upon the car roof.

By mounting the various pieces of control apparatus upon or within the superstructure 4, as illustrated, and locating the customary reverser beneath the car body, as indicated at 18, it is possible to provide complete operation of the propelling motors through the use of a relatively small number of cables extending from the roof to the apparatus beneath the car body, so that very little space is required for this purpose. Furthermore, a large proportion of the control apparatus, by the use of my invention, is placed in a position where the dirt and dust of the roadbed will have practically no effect thereon, and, since such apparatus is usually adapted for weather-proof operation, no increased cost is encountered in this connection.

Another important advantage of the present invention resides in the ease and inexpensiveness of inspection when a number of vehicles are arranged upon parallel tracks running close to each other in a car-house, as is customary practice. Under such conditions, the use of car-pits may be dispensed with, for the most part, since the car-inspector may step from roof to roof of the vehicles and may readily inspect the apparatus upon the various car roofs. The desirability and advantages of such an inspection arrangement will be evident without further exposition.

Referring to Fig. 3, the structure shown embodies the familiar switch-group and frame 25 which are mounted directly upon the car roof, and, in turn, the trolley-bases 10 are mounted upon the switch-group frame, which thus is substituted for the well-known superstructure 4 that is at present employed upon "one-man" cars. In this way, the weight of the bridge 4 is eliminated, with the consequent decrease in initial cost and operation of the vehicle, whereas all of the other above-mentioned advantages of the illustrated general arrangement of apparatus are secured.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with a motor-driven vehicle of relatively reduced height, of a super-structure disposed on the vehicle roof, a plurality of relatively short trolley-poles mounted upon said super-structure and corresponding to different directions of travel, and control apparatus for the vehicle motors entirely located within said super-structure.

2. In a motor-driven vehicle, the combination with a box-like structure mounted on the vehicle roof, of a plurality of trolley-poles mounted upon said structure and corresponding to different directions of travel, and control apparatus for a vehicle motor located within said structure.

In testimony whereof, I have hereunto subscribed my name this 18th day of April 1919.

HARRY R. MEYER.